United States Patent [19]
Taylor

[11] Patent Number: 6,159,405
[45] Date of Patent: Dec. 12, 2000

[54] PHENOLIC RESIN SYSTEM FOR PULTRUSION COMPOSITES

[75] Inventor: John G. Taylor, Louisville, Ky.

[73] Assignee: Borden Chemical, Inc., Columbus, Ohio

[21] Appl. No.: 09/301,315

[22] Filed: Apr. 29, 1999

Related U.S. Application Data

[63] Continuation of application No. 09/157,952, Sep. 22, 1998, abandoned.

[51] Int. Cl.⁷ .................................................. B29C 47/00
[52] U.S. Cl. ................. 264/177.2; 264/169; 264/211.24; 525/501; 528/153; 528/155; 528/156; 524/876
[58] Field of Search ............................ 525/501; 528/153, 528/155, 156; 524/876; 264/169, 177.2, 211.24

[56] References Cited

U.S. PATENT DOCUMENTS

| | | |
|---|---|---|
| 3,485,797 | 12/1969 | Robins . |
| 4,311,631 | 1/1982 | Myers et al. . |
| 4,426,484 | 1/1984 | Saeki ...................................... 524/541 |
| 4,427,797 | 1/1984 | Smith . |
| 4,430,491 | 2/1984 | Culbertson et al. . |
| 4,613,662 | 9/1986 | Goel . |
| 4,639,505 | 1/1987 | Goel . |
| 5,075,413 | 12/1991 | Dailey, Jr. . |
| 5,075,414 | 12/1991 | Dailey, Jr. . |
| 5,243,015 | 9/1993 | Hutchings et al. . |
| 5,344,909 | 9/1994 | Hutchings et al. . |
| 5,362,545 | 11/1994 | Tingley ..................................... 428/96 |
| 5,456,781 | 10/1995 | Tingley . |
| 5,498,460 | 3/1996 | Tingley . |
| 5,547,729 | 8/1996 | Tingley . |
| 5,565,257 | 10/1996 | Tingley . |

*Primary Examiner*—Patricia A. Short
*Attorney, Agent, or Firm*—Stevens, Davis, Miller & Mosher, L.L.P.

[57] ABSTRACT

A fire resistant phenolic resole-resorcinol novolac system for a pultrusion process, having a much improved pot life of the two part mixture, lower emissions during processing and a much better surface finish of the pultruded composite when compared to a similar existing system. A method of making a phenolic resole for pultrusion including, but not limited to, the use of modified phenols such as p-phenyl phenol and nonyl phenol.

21 Claims, 3 Drawing Sheets

PHENOLIC RESIN SYSTEM FOR PULTRUSION COMPOSITES

This application is a continuation of U.S. Ser. No. 09/157,952, filed Sep. 22, 1998, now abandoned.

BACKGROUND OF THE INVENTION

1. Field of the Invention

This invention relates to phenolic resole-resorcinol novolac resin systems for use in pultrusion processes having longer pot life, low free formaldehyde emission and improved surface finish of the pultrusion composite, pultrusion composites comprising a plurality of filaments bonded together by a phenolic resin, such as a resole resin having a resorcinol novolac hardener and pultrusion processes employing the novel resin system. An unexpected property of the phenolic resin system is found in the fire resistance of phenolic resole-resorcinol novolac system particularly suited for pultrusion processes.

2. Description of the Related Art

"Pultrusion" is a well known term of art to describe the drawing of a plurality of fibrous reinforcement coated with a binding solution, through a die in order to shape the fibrous reinforcement and binder into a unitary article of desired shape.

Prior uses of fibrous reinforcement, such as glass fibers, have permitted the formation of varying shapes by the pultrusion process so as to provide a composite structural member which are typically stronger and lighter and may be less expensive than similarly sized single material members, such as wood, and thus, can be used as a competing product to conventional wood or metal structural materials. One particular product of interest is primarily for off-shore platforms. e.g. pultruded grate systems for ships and off-shore oil wells.

Tingley, U.S. Pat. No. 5,456,781, generally illustrates, in FIG. 3, a schematic for a pultrusion process in which a plurality of fiber rovings are pulled through a resin bath and then a forming die and subsequently through a heated die that cures the resin materials and shapes the rovings and resin. Preferred rate through the pultrusion apparatus is 3–5 feet/minutes (0.9–1.5 m/minute), although the rate will vary according to the profile being processed. Although glass fiber has been mentioned as the fiber filaments or rovings, other materials, including synthetic fibers, carbon fibers, natural fibers and inorganic fibers, e.g. ceramic and glass fibers, can be used in the form of filaments, rovings or mats. Suitable for use as fibers in tension are aramid fibers, which are commercially available from E.I. Dupont de Nemours & Company of Delaware under the trademark "KEVLAR" and high modulus polyethylene, which is available under the trademark "SPECTRA" from Allied Fibers of Allied Signal, Petersburg, Va. Synthetic fibers preferably having a modulus of elasticity in tension that is relatively high. For example, synthetic fibers of KEVLAR™ have a modulus of elasticity in tension of about $18 \times 10^6$ psi (124,000 MPa).

Suitable for use as compression fibers are carbon fibers, such as commercially available carbon fibers which have a modulus of elasticity in compression in a range of about $34 \times 10^4$ to $36 \times 10^4$ psi (234,000–248,000 Mpa).

As suitable synthetic resin materials are mentioned epoxy, polyester, vinyl ester, phenolic resins, polyamides, or polystyrylpyridine (PSP) or thermoplastic resins, such as polyethylene terapthylate (PET) and nylon-66.

It is also been known to use a phenolic resin system containing resorcinol, such as a commercially available phenolic resin system containing about 0–60% resorcinol, which is commercially available under the trade designation RESORCIPHEN® 2074A-2026B, now owned by Borden Chemical, Inc. of Columbus, Ohio.

These phenolic resins containing resorcinol are disclosed in the Dailey U.S. Pat. Nos. 5,075,413 and 5,075,414. The resorcinolic component is selected from resorcinol and resorcinol formaldehyde novolac resin. This is reacted with a phenolic resole resin which has a room temperature cure in as little as eight hours. Similar technology for use in pultrusion processes typically requires temperatures in excess of 250° F. with a typical pot life of between 5 and 8 hours.

The entire subject matter of the aforementioned '781, '413 and '414 patents are herein incorporated by reference.

While such products according to the prior art do produce a resin bound composite of fibers, the difficulty with the prior art phenolic resin systems containing resorcinol is a short pot life (low stability) and high formaldehyde emission, which are a source of pollutants of the atmosphere.

SUMMARY OF THE INVENTION

Accordingly, it is primary object of the invention to provide new resin systems, a pultrusion process employing the new resin systems and shaped products, which are free of the disadvantages of the prior art.

Another object of the invention is to provide an improved phenolic resole-resorcinol novolac resin system for a pultrusion process which has a much improved pot life over the heretofore known resin systems.

It is a still further object of the invention to provide a pultrusion process utilizing the new resin systems of the invention, such that much lower formaldehyde emissions and odor eminate from the process.

It is a still further object of the invention to provide an improved resole-resorcinol novolac resin system that may contain a modified phenol that provides an improved surface finish for the pultruded composite.

It is a still further object of the invention to provide an improved resole-resorcinol novolac resin system for a pultrusion process that has excellent resistance to flame spread and extremely low smoke development.

Additional objects and advantages of this invention will be apparent from the following detailed description of preferred embodiments thereof.

DETAILED DESCRIPTION OF PREFERRED EMBODIMENTS

Figure 1:
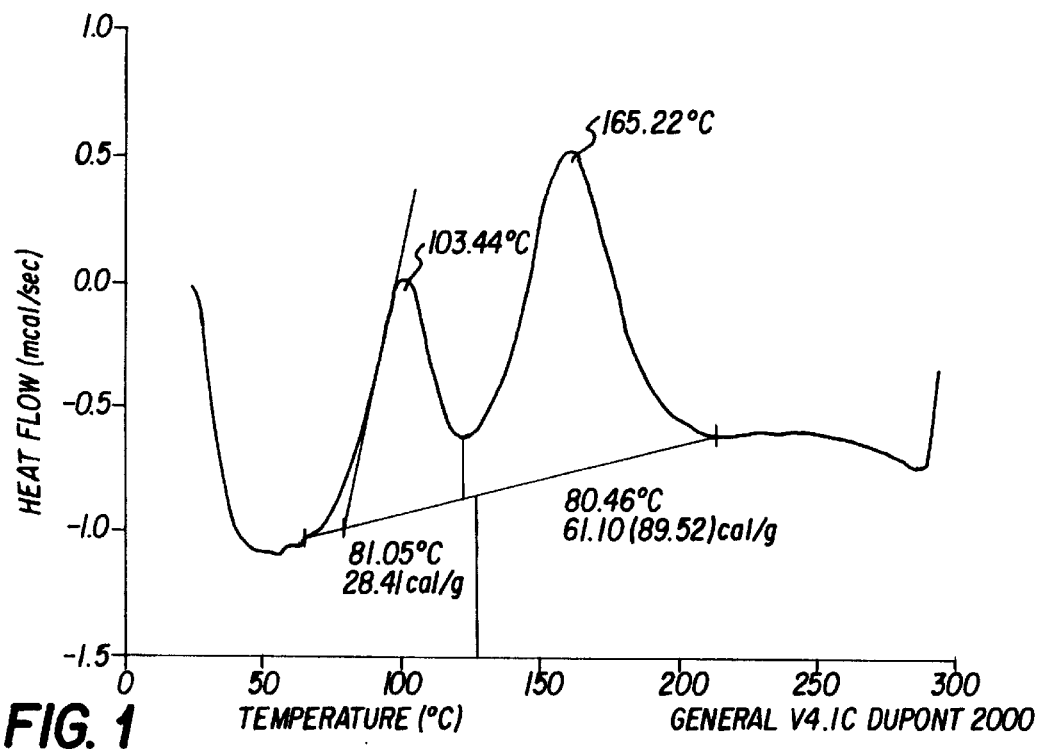
FIG. 1 is a DSC curve of a resole resin having a high free formaldehyde content with a hardener according to the prior art.
Figure 2:
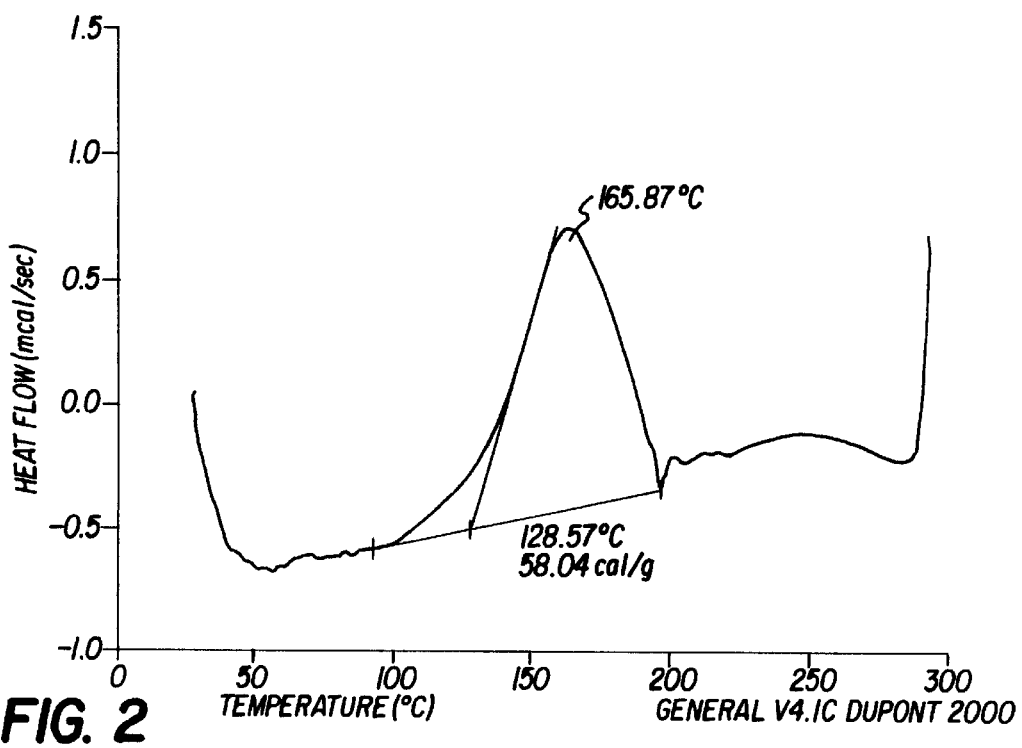
FIGS. 2–6 are DSC curves of resin systems according to the invention.
Figure 3:
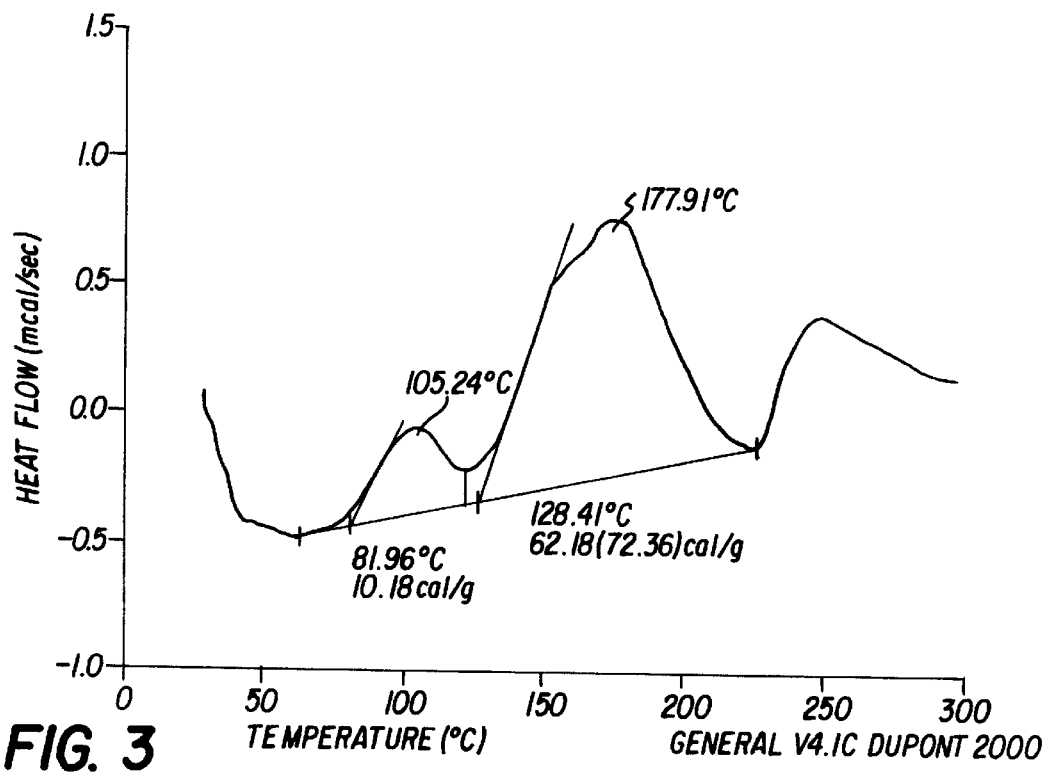
Figure 4:
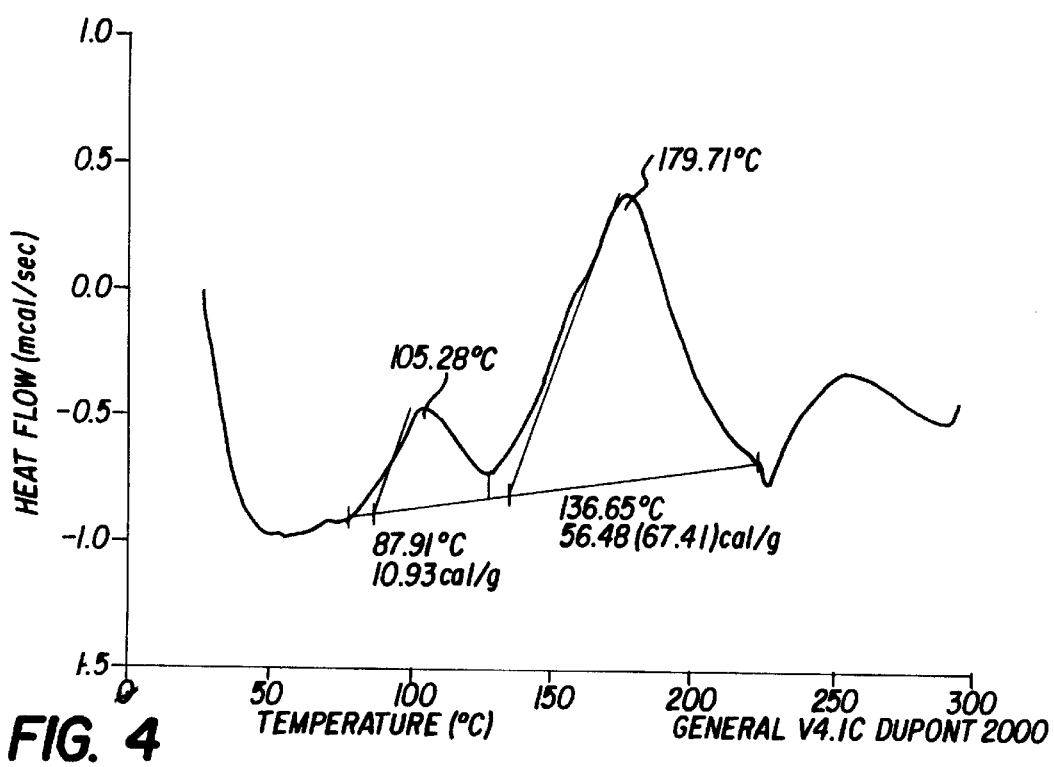
Figure 5:
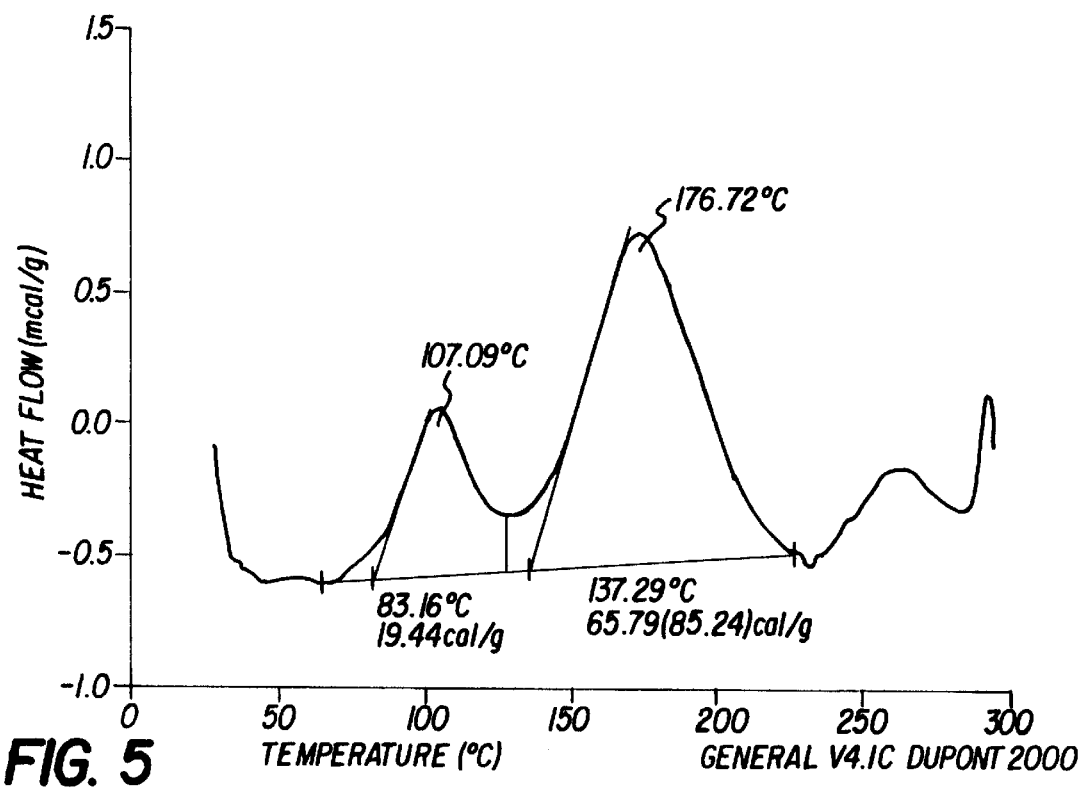
Figure 6:
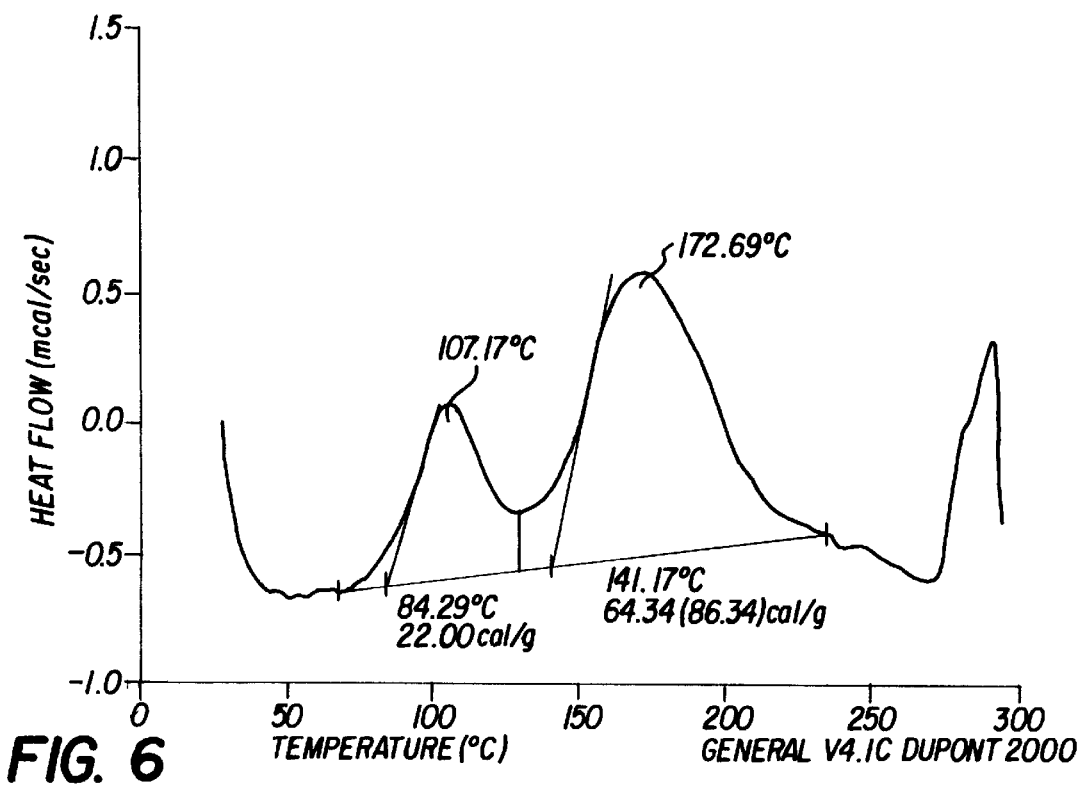

A phenolic resin system for use in a pultrusion process is disclosed in which fibrous reinforcement, such as where filaments are grouped together into strands or fibers, which may be grouped together into twisted strands to form yarns, or untwisted strands to form rovings of a fibrous material or which may be bound together as continuous or chopped strands to form mat, such as of a glass, ceramic, carbon, metal, thermosetting or thermoplastic resin, or natural fibers, which are drawn through a bath of liquid resin and then through a pultrusion die to shape the fibrous reinforcement and resin composite which, upon heating, will cure the shaped material.

In one embodiment of the invention, the shaping die and heating source, such as a heated die, may be separate elements to perform separate functions, i.e. one to shape without cure and the other to maintain the shape and/or reshape the material and heat the material to cure the resin component. In an alternative embodiment of the invention, the shaping and heating die may be an integral unit so as to perform both functions in one single element.

As suitable fibers are any of the fibers known for pultrusion processes in the prior art, including but not limited to natural fibers, carbon fibers, ceramic fibers, metal fibers, synthetic resin fibers, including thermosetting and thermoplastic types, especially aramid fibers and high modulus polyethylene, glass fibers, other inorganic fibers such as composite ceramic fibers and metal fibers, and combinations thereof The fibrous reinforcement may be in filament form or may be in the form of fiber rovings or yarns or in a mat or veil form. As is known in the art, filaments are grouped together into strands or fibers, which may be further grouped together into twisted strands to form yarn, or untwisted strands to form rovings or mat. The content of the fibrous reinforcement and nature thereof will vary according to the desired strength but usually is in a range of 60–85% by weight, preferably 70–80% by weight.

In whatever form the fiber reinforcing material is presented, the fibers are preferably fed from bobbins (spools) through openings in an alignment card that aligns the reinforcement material and prevents it from entangling. The fibrous reinforcement will pass from the alignment card to a first comb that gathers them and arranges them parallel to one another and then passes over a tensioning mandrel under a second alignment cone and through close fitting eyelets directly into a resin bath, where the reinforcement material is thoroughly wetted with a resin material.

However, contrary to the resin materials known in the prior art, the present process uses a phenolic resole resin with a resorcinol/novolac hardener as the binding material which provides longer pot life, reduced emissions and improved surface finish.

The phenolic resole-resorcinol novolac resin system disclosed in this invention has particular utility as an effective binder for pultrusion processes. Upon exposure to flame or radiant heat, it is resistant to flame spread and smoke development. It has advantages over similar existing technologies known in the prior art in that the pot life of the resole-resorcinol novolac hardener mixture is much longer, formaldehyde emissions during processing are lower and the surface finish of the pultruded composite is much better. The resin system is preferably composed of at least one resorcinol component selected from a group consisting of resorcinol and resorcinol formaldehyde novolac resin and a phenolic resin that is preferably, but not necessarily, zinc catalyzed and may be, but is not necessarily, modified with substituted phenols.

The primary component of the system is a phenolic resole, which is combined with a component selected from the group consisting of resorcinol and resorcinol-formaldehyde novolac resin and combinations thereof as a hardener. This combination of the phenolic resole and resorcinol/novolac mixture has a pot life which is several times longer than that of other resole-resorcinol systems that are currently available. Additionally, the formaldehyde emissions that occur during processing of the resole-resorcinol novolac system of the invention are much lower than those that come from other resole-resorcinol systems that are currently available and the surface finish of the composite is much better.

For example, the prior art system previously described in Borden Chemical, Inc.'s RESORCIPHEN® 2074A-2026B resin system where the 2074A (Zinc Acetate Catalyzed Resole) and 2026B Hardener (Resorcinol Novolac) components used in combination as a pultrusion resin had a pot life of about eight hours before the resin began to exotherm and gel. The 2074A resole contains about 10% free formaldehyde.

By contrast, a zinc acetate catalyst resole was used containing up to 6%, preferably up to 5%, most preferably not more than or equal to 4% free formaldehyde in combination with the 2026B hardener in levels ranging from 10 to 30% with the remainder being the resin resole. Surprisingly, the resulting mixture had a pot life of over two days. Though not wishing to be bound by the mechanism, it is believed that the higher free formaldehyde content in the 2074A resole reacts with the high free resorcinol in the 2026B hardener to initiate the reaction and shorten the pot life (minimum life). This is evidenced by the Differential Scanning Calorimetry (DSC) profile (FIG. 1) of Borden Chemical, Inc.'s 2074A/2026B combination. This profile has two exotherm peaks, wherein the first is believed to be the formaldehyde/resorcinol reaction and the second peak is the result of a cross-linking reaction.

The DSC's of modified resoles display the two exotherm peaks of the prior art resin 2074A, yet the pot life of the modified resoles is more than one day compared to less than eight hours for the 2074A. While again not wishing to be bound by the mechanism, it is believed that the longer pot life is also attributable to reducing the free formaldehyde content, and/or by modifying the resole with substituted phenols. Substituted phenols such as p-phenyl phenol and nonyl phenol are less reactive than phenol and result in a less reactive resole.

The much lower free formaldehyde content of the present resin has the further advantage of lowering the formaldehyde emissions that result from curing in the pultrusion die.

The catalyst for making the resole may be any suitable catalyst. It may be selected from, but not limited to, the group consisting of amines and/or metallic hydroxides, oxides, acetates or carbonates of lithium, sodium, potassium, magnesium, calcium or zinc.

The resole is preferably a benzylic ether resole that may be substituted to modify its properties. Substituted phenols suitable for modification of the resin system include, but are not limited to, nonyl phenol and p-phenyl phenol.

It has been shown in application that pultruded composites made from resins with substituted phenols such as p-phenyl phenol or nonyl phenol unexpectedly exhibited superior surface finish when compared to unmodified resins made with the same catalyst and at similar mole ratios of formaldehyde to phenol like molecules. Particularly, unmodified resins produced surfaces with heavy scale accompanied by buildup of cured resin within the die. Resins modified with nonyl or p-phenyl phenol were relatively free of scaling and gave very little resin buildup within the die.

Samples of pultruded composites from several different resin formulations were tested according to ASTM E 662. Results regarding smoke development were unexpectedly high for the formulations. Phenolics are typically expected to give low smoke numbers. Subsequent experiments showed that the mole ratio of formaldehyde to phenol and substituted phenols along with the amount of substituted phenol in the formulation are important elements in controlling smoke development in the cured resin system. Mole ratio and the quantity of substituted phenol present must be balanced to provide the desired combination of pot life, low formaldehyde emissions, low smoke development and superior surface finish of the pultruded composite.

The ranges of the weight percent of the components used in this invention are described in Dailey's patents. A formaldehyde solution may be substituted for paraformaldehyde to deliver the same molar quantity of formaldehyde to the resole. The ranges of the weight percent of the components used in this invention varies, based on the weight of the resin system, from about 35 to 65 weight percent of 50% formaldehyde solution, preferably 45–55 weight percent. Of course, mixtures of paraformaldehyde and formaldehyde solutions may be used to supply the required formaldehyde content .

The resole formulated with p-phenyl phenol has about 5 to 40 weight percent of p-phenyl phenol, preferably 10 to 30 percent; and about 30 to 60 weight percent of phenol, preferably 40 to 55 percent; and about 20 to 45 weight percent of paraformaldehyde, preferably 25 to 40 percent.

The resole formulated with nonyl phenol ha s about 15 to 45 weight percent nonyl phenol, preferably 25 to 35 percent; and about 25 to 55 weight percent phenol, preferably 35 to 45 percent; and about 35 to 65 weight percent of 50% formaldehyde, preferably 45 to 55 percent, or about 19 to about 35 percent paraformaldehyde.

The hardener is essentially the 2026B resorcinol/novolac hardener of the prior art. It is approximately 70% solids with less than 30% free resorcinol, some water and resorcinol-formaldehyde novolac polymer.

The technical characteristics of the invention have been demonstrated through a series of experiments. Results of these experiments are reported in the following Examples. All "parts" and "percentages" are by weight unless otherwise indicated.

EXAMPLE 1

In this test, 100 parts of phenol and 7.9 parts of a 27.5% zinc acetate dihydrate solution were charged to a reactor and heated to 100° C. 127.6 parts of a 50% formaldehyde solution were fed into the reactor over a 50-minute period. Batch temperature was maintained at 100° C. for 4 hours. The resin was dehydrated under vacuum to 90° C. Temperature was maintained at 90° C. until the viscosity of the resin at 75° C. was 300–400 cps. 10 parts of ethanol were charged, the resin cooled and discharged.

EXAMPLE 2

In this test, 100 parts of phenol and 7.9 parts of a 27.5% zinc acetate dihydrate solution were charged to a reactor and heated to 95 ° C. 92.6 parts of a 50% formaldehyde solution were fed into the reactor over a 50-minute period. Batch temperature was increased to 100° C. and maintained for 4 hours. A solution consisting of 1.2 parts of citric acid and 1.2 parts of water was added to the reactor. The resin was dehydrated under vacuum to 90° C. The temperature was maintained until the viscosity of the resin at 50° C. was 2400–2700 cps. 14 parts of ethanol were charged, the resin cooled and discharged.

EXAMPLE 3

This formulation is identical to that in Example 2, except that the solution of citric acid and water is omitted and the initial hold time is reduced from 4 hours to 2 hours.

EXAMPLE 4

In this test, 100 parts of phenol, 84.2 parts of nonyl phenol and 7.9 parts of a 27.5% zinc acetate dihydrate solution were charged to a reactor and heated to 95° C. 121 parts of a 50% formaldehyde solution were fed into the reactor over a 50-minute period. The batch was maintained at 95° C. for an additional 4 hours and then cooled to 50° C. The resin was dehydrated under vacuum to 95° C. The temperature was maintained at 95° C. until the viscosity of the resin at 75° C. was 200–300 cps. 14 parts of ethanol were added, the resin cooled and discharged.

EXAMPLE 5

In this test, 75 parts of phenol, 65 parts of p-phenyl phenol and 7.9 parts of 27.5% zinc acetate dihydrate solution were charged to a reactor and heated to 115° C. 65.8 parts of 92% paraformaldehyde were added to the reactor in six increments while gradually reducing the batch temperature to 95° C. The batch temperature was maintained at 95° C. for one hour. 25 parts of phenol were charged and the batch temperature maintained at 95° C. for an additional three hours. The resin was dehydrated under vacuum to 90° C. Batch temperature was maintained at 90° C. until the viscosity of the resin at 75° C. was 400–500 cps. 25 parts of ethanol were added, the resin cooled and discharged.

EXAMPLE 6

In this test, 75 parts of phenol, 65 parts of p-phenyl phenol and 7.9 parts of a 27.5% zinc acetate dihydrate solution were charged to the reactor and heated to 115° C. 94.3 parts of 92% paraformaldehyde were charged to the reactor in six increments while gradually reducing the batch temperature to 95° C. The batch temperature was maintained at 95° C. for one hour. 25 parts of phenol were charged to the reactor and the batch temperature was maintained at 95° C. for an additional two hours. The temperature was increased to 100° C. and held another three hours. The resin was dehydrated under vacuum to 90° C. The batch temperature was maintained at 90° C. until the viscosity of the resin at 75° C. was 1300 cps. 25.4 parts of ethanol were added, the resin cooled and discharged.

EXAMPLE 7

In this test, 100 parts of phenol, 43.1 parts of p-phenyl phenol, 67.2 parts of 92% paraformaldehyde and 6.5 parts of 27.5% zinc acetate dihydrate solution were charged to a reactor and heated to 100° C. Batch temperature was maintained at 100° C. for three hours. The resin was dehydrated under vacuum to 90° C. Batch temperature was maintained at 90° C. until the viscosity of the resin at 75° C. was 440 cps. 16.6 parts of ethanol was added, the resin cooled and discharged.

EXAMPLE 8

In this test, 100 parts of phenol, 25.7 parts of p-phenyl phenol, 68.3 parts of 92% paraformaldehyde and 5.4 parts of 27.5% zinc acetate dihydrate solution were charged to a reactor and heated to 95° C. Batch temperature was maintained at 95° C. for three hours. The resin was dehydrated under vacuum to 90° C. The batch temperature was maintained at 90° C. until the viscosity of the resin at 75° C. was 400–500 cps. 9.9 parts of ethanol were added, the resin cooled and discharged.

EXAMPLE 9

In this test, 100 parts of phenol, 11.6 parts of p-phenyl phenol, 69.2 parts of 92% paraformaldehyde and 4.5 parts of a 27.5% zinc acetate dihydrate solution were charged to a reactor and heated to 100° C. Batch temperature was maintained at 100° C. for three hours. The resin was dehydrated under vacuum to 90° C. Temperature was held at 90° C. for two hours, then increased to 100° C. Batch temperature was held at 100° C. until the viscosity of the resin at 75° C. was 400 cps. 16.2 parts of ethanol were added, the resin cooled and then discharged.

EXAMPLE 10

In this test, three parts of the resin described in example 5 were physically mixed with one part of Resorciphen( 2074A).

EXAMPLE 11

In this test, one part of the resin described in example 5 was physically mixed with three parts of Resorciphen (2074A).

EXAMPLE 12

In this test, the resin described in example 5 was physically mixed with Resorciphen (2074A) in 1:1 blend by weight.

EXAMPLE 13

Resins for Examples 2,5,7,8 and 9 and the 2074A resin were mixed with the 2026B hardener in weight ratios of 4:1 respectively. Samples were submitted for evaluation by DSC and monitored for pot life. DSC profiles are shown in FIGS. 1,2,3,4, 5 and 6 respectively. Pot life results are shown below:

| Resin | Free Formaldehyde, % | Pot Life (time to gel) |
|---|---|---|
| 2074A (FIG. 1) | 10.0 | 7–8 hours |
| Resin 2 (FIG. 2) | 1.5 | >one day |
| Resin 5 (FIG. 3) | 2.0 | >one day |
| Resin 7 (FIG. 4) | 3.3 | >one day |
| Resin 8 (FIG. 5) | 4.7 | >one day |
| Resin 9 (FIG. 6) | 3.3 | >one day |

Results indicate that high free formaldehyde (6–10%) results in short pot life. The first of two peaks in the DSC and a low onset of exotherm temperature may indicate a reaction between free formaldehyde and free resorcinol, which may initiate room temperature gelation of more reactive resoles, contributing to a relatively short pot life of the system. Less reactive resoles that contain p-phenyl phenol may not be able to sustain a room temperature reaction between the free formaldehyde and the free resorcinol in the system, which may contribute to a longer pot life.

EXAMPLE 14

Resins for Examples 2, 4 and 5 and the 2074A resin were used at a 4:1 mix ratio of resin to hardener and were pultruded with glass roving at sufficient line speeds and die temperatures to produce a fiber reinforced rod of one inch diameter. Specimens of ½ inch square were rendered from the rod stock and mechanical properties tested as per applicable ASTM procedures. Results are listed below:

| Resin | Short Beam Shear, psi (Std. Dev.) |
|---|---|
| 2074A | 3,242 (270) |
| Resin 2 | 3,478 (90) |
| Resin 4 | 3,930 (122) |
| Resin 5 | 3,507 (118) |

This example demonstrates that the resins of the invention have mechanical properties comparable to those of the known prior art.

EXAMPLE 15

Resins for Examples 5, 8, and 12 were used at a 4:1 mix ratio of resin to hardener and were pultruded with glass roving and mat at sufficient line speeds and die temperatures to produce one-inch fiber reinforced I-beam. The I-beam were assembled into grating and tested for load bearing capability using a three-point bend. Results are listed below:

| Resin | Max deflection, in | Ultimate load, lbs. | Stress, psi | Stiffness, lb/in2 |
|---|---|---|---|---|
| Resin 5 | 1.02 | 2611 | 37,498 | 2.50E + 006 |
| Resin 8 | 1.07 | 2425 | 34,827 | 2.20E + 006 |
| Resin 12 | 1.10 | 2625 | 37,699 | 2.32E + 006 |

This example demonstrates that resins for examples 8 and 12 have strengths comparable to the control resin from example 5, which had strengths that compared favorably to those of the known prior art resin. Also, all three resins in this example exhibit load-bearing capabilities that are in excess of 10 times the in-service requirements.

EXAMPLE 16

Resins for Examples 1, 2, 5 and 6 and the 2074A resin were used at a 4:1 mix ratio of resin to hardener and cured in a three inch diameter aluminum pan at times and temperatures sufficient to insure complete cross-linking. The cured resin discs were removed from the pans and evaluated for relative smoke evolution by subjecting the discs to the flame from a propane torch. Results are listed below:

| Resin | Results |
|---|---|
| 2074A and Resin 1 | Smoked the least |
| Resin 2 | Smoked more than 2074A and Resin 1, but less than Resins 5 and 6 |
| Resins 5 and 6 | Smoked the most |

Results indicate that resins with a high Formaldehyde/ Phenol (F/P) mole ratio give off less smoke than resins with lower F/P mole ratios. These lower F/P resin will, in turn, smoke less than resins with a higher overall ratio of Formaldehyde to total Phenolic like bodies when those Phenolic like bodies include a significant amount of p-phenyl phenol. This result was unexpected.

EXAMPLE 17

Cured resin discs from resins for Examples 5, 10, 11 and 12 and the 2074A resin were prepared as per the procedure in Example 16. Results are listed below:

| Resin | Results |
| --- | --- |
| 2074A | Smoked the least |
| Resin 12 | Smoked slightly more than 2074A |
| Resin 11 | Smoked slightly more than Resin 12 |
| Resin 10 | Smoked slightly more than Resin 11 |
| Resin 5 | Smoked much more than the other samples |

Results indicate that a relatively small reduction in the p-phenyl phenol content combined with a relatively small increase in the ratio of Formaldehyde to Phenolic like bodies has a significant impact on the amount of smoke that the cured resin will evolve when exposed to flame.

EXAMPLE 18

Resins for Examples 2, 4, 5, 7, 8, 9, 10 and 12 and the 2074A resin were used at a 4:1 mix ratio of resin to hardener and were pultruded with glass roving at sufficient line speeds and die temperatures to produce fiber reinforced flat stock of ¼"×⅛" dimensions. Strips of flat stock were assembled into 3"×3" specimens using phenolic resin as the backing adhesive. Specimens were inspected for defects and submitted to an outside test lab for evaluation of smoke evolution using the ASTM E 662 test procedure. Results are listed below:

| Resin | Ave. Dm, non-flaming | Ave. Dm, flaming | Appearance and Processability |
| --- | --- | --- | --- |
| 2074A | 2.36 | 5.36 | Much scaling/surface defects noticed. Frequent stops necessary to purge/clean die. |
| Resin 2 | | 7.90 | Some surface scaling noted. Occasional stops necessary to purge/clean die. |
| Resin 4 | | 26.24 | Surface was defect free. No purges necessary to clean die. |
| Resin 5 | 16.81 | 36.34 | Surface was defect free. No purges necessary to clean die. |
| Resin 7 | | 29.19 | Surface was defect free. No purges necessary to clean die. |
| Resin 8 | | 19.32 | Surface was defect free. No purges necessary to clean die. |
| Resin 9 | | 9.76 | Much scaling/surface defects noticed. Frequent stops necessary to purge/clean die. |
| Resin 10 | | 27.39 | Surface was defect free. No purges necessary to clean die. |
| Resin 12 | 3.03 | 13.53 | Surface was defect free. No purges necessary to clean die. |

This example quantifies the results and conclusions reached in earlier Examples that show that higher mole ratios of Formaldehyde to Phenolic like bodies and lower modified phenol content reduce smoke development. Unexpectedly, the surface finish and the processability of the resins containing modified phenols were much superior to the prior art 2074A resin. Resin 2 (with lower free formaldehyde and F/P mole ratio, no modified phenols) also had an improved surface finish and better processability than the prior art resin 2074A. Processability is a function of buildup within the die. Stopping the puller to purge or remove resin buildup within the die is a common pultrusion technique.

EXAMPLE 19

Resins for Examples 5 and 8 were used at a 4:1 mix ratio of resin to hardener and were pultruded with glass roving and mat at line speeds and die temperatures to produce one-inch fiber reinforced I-beam. The I-beam were assembled into grating and tested for Flame Spread using ASTM E 84. Results are listed below:

| Resin | Flame Spread Index |
| --- | --- |
| Resin 5 | 0 |
| Resin 8 | 5 |

Values are indexed to asbestos equal to zero and red oak equal to 100. The results demonstrate that these resins have excellent resistance to flame spread.

EXAMPLE 20

Resins for examples 5 and 8 and the 2074A resin were used at a 4:1 mix ratio of resin to hardener and then those mixtures were diluted at a 2:1 ratio of resin mix to ethanol. A piece of filter paper was dipped into each mixture, weighed and placed in a tube furnace. The specimen(s) were heated to 400° F. in five minutes and held at temperature for ten minutes while a nitrogen sweep evacuated the gases in the furnace through an impinger and into a known quantity of deionized water. The water was calorimetrically evaluated for formaldehyde content. The Ave. % free formaldehyde emitted is reported as a function of the original resin/hardener mixture as calculated from the data.

| Resin | % free formaldehyde of liquid resole | Ave. % free formaldehyde emitted |
| --- | --- | --- |
| 2074A | 10.0 | 6.4 |
| Resin 5 | 2.0 | 1.2 |
| Resin 8 | 4.7 | 3.1 |

The results suggest a linear relationship between the free formaldehyde content of the liquid resole and the formaldehyde given off during cure. The resins of the invention may be expected to have about one-half or less the level of formaldehyde emissions as the existing prior art resin 2074A.

It will be obvious to those having skill in the art that many changes may be made to the details of the above-described embodiment of the invention without departing from the underlying principles thereof. The scope of the present invention should be determined, therefore, only by the following claims.

I claim:

1. A fire resistant resin having low formaldehyde emissions for use in a pultrusion process comprising the reaction product of:

(a) at least one resorcinol component selected from the group consisting of resorcinol and resorcinol formaldehyde novolac resin, wherein said resorcinol formaldehyde novolac resin comprises the reaction product of an aldehyde and resorcinol in the presence of an acidic catalyst; and (b) a phenolic resole resin comprising the reaction product of a phenolic material selected from the group consisting of phenol, substituted phenols and mixtures thereof; and either formaldehyde or paraformaldehyde, wherein the free formaldehyde content of the reaction product of (a) and (b) is less than or equal to 6%.

2. The resin of claim 1 wherein the component (b) comprises a multi-carbon para substituted phenol.

3. The resin of claim 2 wherein said reaction product has substantially reduced formaldehyde emissions comparable to a reaction product of (a) and (b) having a free formaldehyde content of greater than 6%.

4. The resin of claim 2 wherein said resin has a pot life of more than eight hours.

5. The resin of claim 1 wherein said reaction product has substantially reduced formaldehyde emissions comparable to a reaction product of (a) and (b) having a free formaldehyde content of greater than 6%.

6. The resin of claim 1 wherein the resole is formulated with about 5 to about 40 weight percent of p-phenyl phenol, about 30 to about 60 weight percent phenol and about 20 to about 45 weight percent paraformaldehyde.

7. The resin of claim 6 wherein at least some of the paraformaldehyde is partially substituted by a formaldehyde solution.

8. The resin of claim 1 wherein the resole is formulated with about 15 to about 45 weight percent nonyl phenol, about 25 to about 55 weight percent phenol and about 35 to about 65 weight percent of 50% formaldehyde.

9. The resin of claim 8 wherein at least some of the 50% formaldehyde is at least partially substituted by paraformaldehyde.

10. The resin of claim 1 wherein the free formaldehyde content is not more than 5%.

11. The resin of claim 1 wherein the free formaldehyde content is not more than 4%.

12. The resin of claim 1 wherein said resin has a Dm value for smoke evolution of less than 40.

13. A reinforced plastic fire retardant article comprising the resin of claim 1 and fibrous reinforcement selected from a material from the group consisting of fibers of glass, metal, synthetic resin, carbon, ceramic, natural fibers and mixtures thereof.

14. The article of claim 13 comprising a pultruded article exhibiting a surface finish that is relatively free of defects.

15. The article of claim 13 wherein said article exhibits excellent cross-sectional integrity.

16. A pultrusion process comprising:
   (a) wetting a source of fibrous reinforcement with a resin; and
   (b) shaping the same by pulling through a die, wherein said resin is the resin of claim 1.

17. The process of claim 16 wherein said process requires few purges to clean the die of internal buildup of cured resin.

18. A fire resistant resin having low formaldehyde emissions for use in a pultrusion process comprising the reaction product of:
   (a) at least one resorcinol component selected from the group consisting of resorcinol and resorcinol formaldehyde novolac resin, wherein said resorcinol formaldehyde novolak resin comprises the reaction product of an aldehyde and resorcinol in the presence of an acidic catalyst; and
   (b) a phenolic resin comprising the reaction product of a phenolic material selected from the group consisting of p-phenyl phenol and nonyl phenol; and either formaldehyde or paraformaldehyde, wherein the free formaldehyde content of the reaction product of (a) and (b) is less than or equal to 6%.

19. The resin of claim 18 wherein p-phenyl phenol is present in an amount from about 10 to about 30 percent, phenol is present in amount from about 40 to about 55 percent and paraformaldehyde is present in an amount from about 25 to about 45 percent.

20. The resin of claim 19 wherein the nonyl phenol is present in amount from about 25 to about 35 percent, phenol is present in an amount from about 35 to about 45 percent and 50% formaldehyde is present in an amount from about 45 to about 55 percent.

21. The resin of claim 19 wherein at least some of the paraformaldehyde is at least partially substituted by a formaldehyde solution.

* * * * *